April 1, 1969 P. C. KESLING 3,435,527
SAFETY LOCK PIN

Filed Feb. 19, 1968 Sheet 1 of 2

INVENTOR
PETER C. KESLING
BY
Marzell, Johnston, Cook & Root
ATTORNEYS

April 1, 1969   P. C. KESLING   3,435,527
SAFETY LOCK PIN
Filed Feb. 19, 1968   Sheet 2 of 2
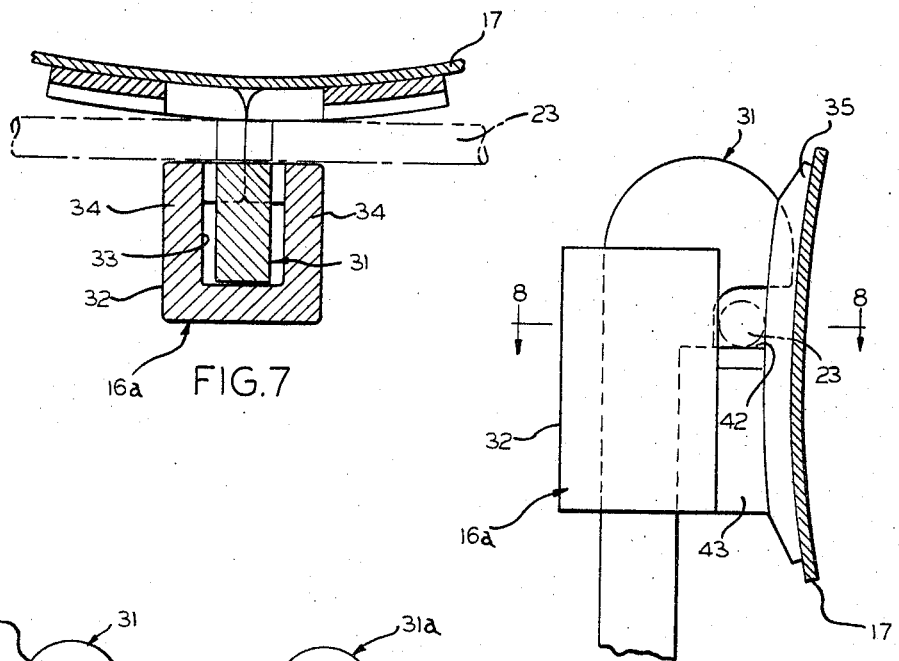
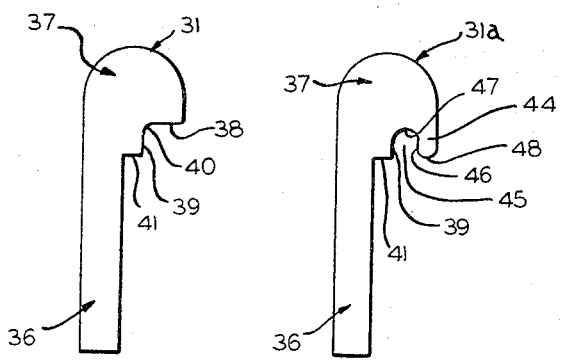
INVENTOR
PETER C. KESLING
BY
*Mergell, Johnston, Cook + Root*
ATTORNEYS

United States Patent Office 3,435,527
Patented Apr. 1, 1969

3,435,527
SAFETY LOCK PIN
Peter C. Kesling, Green Acres, La Porte, Ind. 46350
Filed Feb. 19, 1968, Ser. No. 706,323
Int. Cl. A61c 7/00
U.S. Cl. 32—14                                8 Claims

ABSTRACT OF THE DISCLOSURE

An orthodontic lock pin for use with an orthodontic bracket to lock an arch wire to the bracket and permit tipping of the bracket relative to the arch wire by defining a pin surface in spaced relation to an opposed bracket surface to allow movement of the arch wire therebetween.

---

This invention relates in general to an orthodontic appliance, and more particularly to an orthodontic lock pin for use with an orthodontic bracket to attach and lock an arch wire to a bracket on a tooth during orthodontic treatment of a patient, and still more particularly to a safety lock pin for use with a certain bracket to permit certain relative tipping action between the bracket and arch wire.

Heretofore, safety lock pins have been available for certain types of brackets, as shown in United States Patent 3,085,336. With the advent of new forms of brackets, certain disadvantages have been realized through the use of heretofore known safety lock pins with those brackets.

The present invention is intended to overcome difficulties experienced with the use of heretofore known lock pins on new forms of brackets. In particular, the present invention is particularly useful with the Unipoint light wire bracket made by Unitek of California. The lock pin of the present invention may take several forms, but is capable of providing better rotational control on a tooth when the arch wires employed are smaller than the width of the bracket notch. Further, the lock pin of the present invention better distributes the load on the pin relative to the bracket, thereby substantially eliminating the possibility of pin failure. The preferred embodiment of the pin according to the present invention includes an elongated shank portion and a head portion defined partly by the shank portion and a substantially parallel extending stop portion connected to one end of the shank portion by an intermediate portion to define a more confined area into which the arch wire is inserted.

Accordingly, it is an object of the present invention to provide an improved safety lock pin for use with certain types of brackets.

Another object of the present invention is in the provision of an improved safety lock pin that obtains better rotational control on a tooth where the arch wire employed is smaller than the width of the bracket notch, and better distributes the load on the pin relative the bracket to reduce the failure possibility.

Other objects, features and advantages of the invention will be apparent from the following detailed disclosure, taken in conjunction with the accompanying sheets of drawings, wherein like reference numerals refer to like parts, in which:

FIG. 7 is a side elevational view of a modified bracket and safety lock pin according to the present invention;

FIG. 8 is a detailed sectional view taken substantially along line 8—8 of FIG. 7;

FIG. 9 is a side elevational view of the lock pin of FIG. 7, somewhat reduced, and removed from a bracket; and FIG. 10 is a side elevational view of a further modified safety lock pin that may be employed with the bracket shown in FIGS. 7 and 8.

Figure 1:
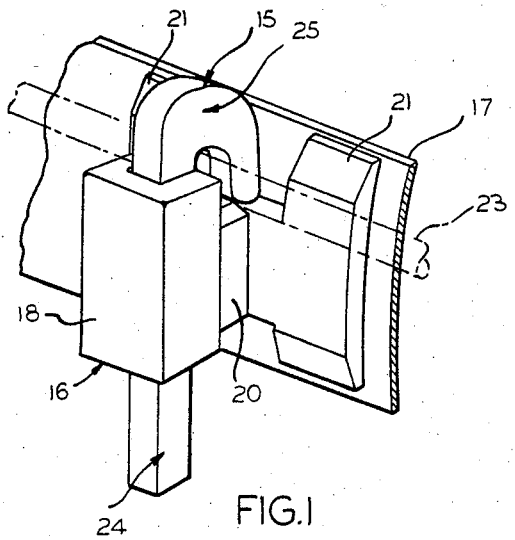
FIG. 1 is a perspective view of a safety lock pin according to the present invention mounted in a bracket, prior to bending over of the tail of the pin, and illustrating the locked arch wire in dotted lines.
Figure 2:
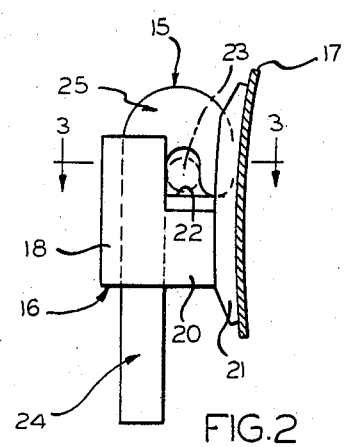
FIG. 2 is a side elevational view of the lock pin and bracket arrangement shown in FIG. 1.
Figure 3:
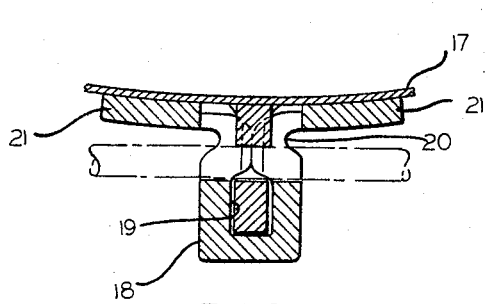
FIG. 3 is a sectional view taken substantially along line 3—3 of FIG. 2.
Figure 4:
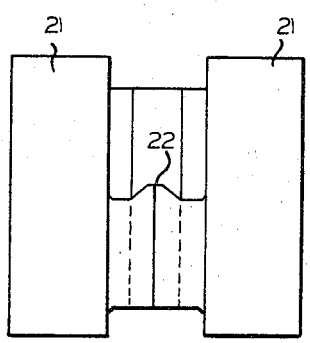
FIG. 4 is a rear elevational view of the bracket shown in FIGS. 1–3 as removed from the tooth band.

Referring now to the drawings, and particularly to the embodiment of FIGS. 1–5, a safety lock pin according to the invention, generally designated by the numeral 15, is shown in FIGS. 1–3 in association with a bracket 16 of a particular configuration. The bracket 16 is illustrated in FIGS. 1–3 as being secured to a tooth band 17, that in turn will be suitably secured to a tooth of a patient. However, the safety lock pin of the present invention may also be employed with a bracket that is attached directly to a tooth, where a tooth band is not needed.

The bracket 16 includes generally a body 18 shaped to define an occlusally-gingivally extending opening 19 in spaced relation from the band 17. The opening 19 is closed on four sides at the lower end of the body and open on the lingual side at the upper end of the body. A bridging or connecting portion 20 extends between the body 18 and a pair of spaced attaching flanges 21, the latter of which abut against the tooth band 17 and are suitably attached thereto such as by soldering or welding. For purposes of further describing the invention, the uppermost end of the bracket 16 will be termed the gingival end while the lowermost end will be termed the occlusal end. As seen particularly in FIG. 2, the occlusal end of the bridging portion 20 is substantially coplanar with the occlusal end of the body 18. The upper or gingival end of the bridging portion 20 terminates substantially short of the gingival end of the body 18, and is formed to be essentially pointed as at 22, FIG. 4, to provide a pivot point for an arch wire. In the illustration of FIGS. 1–3, the arch wire 23 is shown substantially resting against the pointed end 22 of the bridging portion 20. Further, the pointed gingival end 22 of the bridging portion 20 extends substantially between the lingual edge of the body 18 and the buccal faces of the attaching flanges 21, and the lingual edges of the body 18, extending above the pointed end 22, coact with the pointed end 22 and the opposed buccal faces of the attaching flanges 21 to define an arc wire notch or slot for initially receiving the arch wire prior to locking it thereto with a safety lock pin 15. Normally, the buccal-lingual depth of the slot or notch is slightly greater than the diameter of the arch wire 23, as is illustrated in FIG. 2. The lock pin opening 19 is closed from the pointed end 22 of the connecting bridge 20 occlusally downwardly, and open from the pointed end 22 gingivally upwardly at the lingual side.

The safety lock pin 15 of the present invention serves to lock the arch wire 23 in place on the bracket 16 in such a manner as to facilitate tipping relative the arch wire and bracket, and accordingly a loose fit occlusal-gingivally is established by the lock pin 15 when it is in locking position. To accomplish this loose fit, the lock pin 15 includes an elongated shank portion 24 that preferably has a rectangular cross section slightly smaller than the lock pin opening 19 of the bracket 16 to permit easy insertion therein. It should be appreciated that the shank portion may be round or otherwise shaped in cross section. The shank portion 24 is received in the opening 19, while a portion of the lock pin head 25 is also received in the opening at the gingival end thereof. The head 25 is formed by a portion of the shank portion 24, a stop portion 26, and an intermediate connecting portion 27. The stop portion 26 extends substantially parallel to the shank portion and terminates occlusally in a rounded nose 28, although the nose could be squared off if desired. An arch wire receiving slot or notch 29 is defined at the lock pin head 25 and having a gingival arcuate end wall 30. The buccal-lingual depth of the notch 20 is slightly larger than an arc wire desired to be used therewith as shown by the arch wire 23 in FIG. 2. The position of the slot 29 as seen in FIG. 2 is such as to hold the arch wire 23 against the lingual side of the body 18 that projects above the pointed end 22 of the bridging portion 20. It should be appreciated that the position of the slot relative to the lingual end of the body 18 and the buccal faces of the attaching flanges 21 may be at any desired location. Confining of the arch wire 23 in the manner shown, provides better rotational control on the tooth to which the bracket is mounted when the arch wire used is smaller than the width of the bracket notch since the lock pin comes down on both sides of the wire and fits closely thereover. The gingival-occlusal depth of the lock pin slot 29 is such that it will be greater than the thickness of the arch wire to provide a loose gingival-occlusal fit of the arch wire so that tipping between the arch wire and the bracket will be enhanced. The length of the slot 29 is regulated by the length of the stop portion 26 inasmuch as the nose 28 thereof engages on the inner or lingual end of the pointed end 22 and prevents further downward or occlusal movement of the lock pin. When the lock pin is properly positioned, the tail end of the pin may be bent over the bracket to lock it in place.

Upon insertion of the lock pin 15 into place on the bracket 16, the load on the pin is transmitted through the nose 28 to the lingual edge of the bracket which is a strong point of the bracket adjacent to the bending thereby reducing the possibility of operational failure of the pin and better distributing the load of the pin on the bracket.

Figure 5:
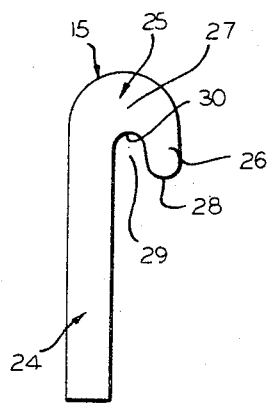
FIG. 5 is a side elevational view of the safety lock pin illustrated in FIGS. 1–3.
Figure 6:
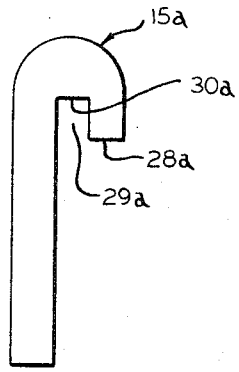
FIG. 6 is a side elevational view of a modified safety lock pin, similar to the embodiment of FIG. 5 but especially useful for wire having a rectangular cross section.

The lock pin 15A shown in FIG. 6 differs from the lock pin 15 of FIG. 5 in two respects, but is primarily useful for arch wire having a rectangular cross section, while the embodiment of FIG. 5 is primarily useful for arch wire having a cylindrical cross section. The pin 15A is provided with a flat nose 28a and a straight gingival end wall 30a. Thus, the slot or notch 29a defined is more rectangular in cross section. Otherwise, the pin of FIG. 6 is the same and operates the same as the pin of FIG. 5 with respect to the bracket 16.

Referring now to the embodiment of FIGS. 7, 8 and 9, a safety lock pin 31 according to the invention is shown in association with a bracket 16A that is slightly different in configuration than the bracket 16 in FIGS. 1–4. This bracket differs in that the body 32 at the gingival end defines a pin opening 33 having a greater buccal-lingual depth than with respect to the pin opening in the bracket 16. This is accomplished by extending the opposed buccal-lingual walls 34 inwardly or lingually beyond the closed part of the pin opening at the occlusal end of the body. This results in reducing the buccal-lingual depth of the bracket arch wire slot or notch, and for the embodiment shown in FIG. 7, provides a relatively snug fit for the arch wire 23. Still better rotational control of a tooth will be provided with this bracket than with the bracket pin combination of FIGS. 1–5, since the arch wire 24 is held against the buccal faces of the attaching flanges 35.

The safety lock pin 31 of this embodiment includes an elongated shank portion 36 having a rectangular cross section of a size to fit within the closed portion of the bracket pin openings 33, and a head 37 at the gingival end which coacts with the bracket to properly lock the arch wire 23 in place. The head 37 is enlarged and of a buccal-lingual depth to extend into the area between the attaching flanges 35 and substantially against the band 17 in a similar manner as is accomplished by the lock pin 15 of FIGS. 1–5. A notch is defined on the head for coacting with the bracket notch in confining the arch wire 23 therein that includes a buccal-lingual extending wall 38 arranged substantially normal to a gingival-occlusal extending wall 39 that is interconnected by an arcuate wall 40. The width of the pin between the wall 39 and the buccal edge is greater than the width of the shank portion 36 and therefore defines a shoulder 41 that acts as a stop portion in engaging the gingival end 42 of the bridging portion 43 and thereby limits the insertion of the lock pin in the bracket. That portion of the gingival end 42 between the buccal faces of the attaching flanges and the lingual edge of the body may be pointed. The gingival-occlusal length of the pin notch (the distance between the shoulder 41 and the wall 38) would be greater than the thickness of the arch wire 23 so that a loose gingival-occlusal fit of the wire is established when the lock pin 31 is in locking position with respect to the bracket 16A as shown in FIG. 7, thereby facilitating the tipping between the arch wire and bracket.

A still further modified lock pin 31A is shown in FIG. 10 for use with the bracket of FIGS. 6 and 7. This pin differs from the lock pin 31 of FIG. 9 only in that a supplementary stop and wire containing portion 44 is provided which extends downwardly at the lingual edge of the pin to a parallel position with respect to the wall 39 to define an arch wire receiving slot or notch 45. This slot or notch is defined by the wall 39, a substantially parallel extending wall 46 on the buccal side of the portion 44 and an interconnecting arcuate wall 47. This pin would be employed where an arch wire is desired to provide better rotational control inasmuch as the wire would be confined on both of the buccal and lingual sides. Moreover, the load of the pin on the bracket would be better distributed in that the nose 48 would also bear against the pointed end 42 as would the shoulder 41. This pin would in other respects operate the same as the pin 31 with respect to the bracket 16A.

It will be understood that modifications and variations may be effected without departing from the scope of the novel concepts of the present invention.

The invention is hereby claimed as follows:

1. In an orthodontic appliance including a bracket adapted to be secured to a tooth band wherein the bracket includes a body spaced from the band having a pin receiving opening extending gingival-occlusally and closed at the occlusal end and open lingually at the gingival end, a pair of spaced attaching flanges abutting the band and secured thereto, a bridging portion between the attaching flanges and body extending from the occlusal end of the body gingivally and terminating substantially short of the gingival end of the body, and a pointed end at the gingival end of the bridging portion, the pointed end extending between the open end of the pin opening and between the attaching flanges, the pointed end together with the buccal faces of the attaching flanges and the opposed lingual edge of the body defining an arch wire slot having a buccal-lingual depth substantially greater than the arch wire thickness, the improvement in a safety lock pin comprising an elongated rectangular in cross section shank portion adapted to be received in the pin opening of the bracket, a head at the gingival end of the shank portion extending lingually toward said band and having a buccal-lingual depth to freely engage the band, said head including a stop portion and an intermediate portion coacting with a part of the shank portion to define a wire receiving slot, and the gingival-occlusal length of said stop portion and slot being such that when the free end thereof abuts the pointed end of the bridging portion the gingival-occlusal opening defined by the slot and the pointed end will be greater than the thickness of the wire to facilitate relative tipping between the bracket and wire, whereby the pin slot will retain the wire within the bracket arch wire slot when the pin is inserted in the bracket.

2. In an orthodontic appliance as defined in claim 1, wherein the gingival end of the pin slot is concavely arcuate for use with a round wire.

3. In an orthodontic appliance as defined in claim 1, wherein the gingival end of the pin slot is flat and buccal-lingually extending for use with a rectangular wire.

4. In an orthodontic appliance as defined in claim 1, wherein the free end of the stop portion is convexly arcuate.

5. In an orthodontic appliance as defined in claim 1, wherein the free end of the stop portion is straight and buccal-lingually extending.

6. In an orthodontic appliance including a bracket adapted to be secured to a tooth band wherein the bracket includes a body spaced from the band having a pin receiving opening extending gingival-occlusally and closed at the occlusal end and open lingually at the gingival end, a pair of spaced attaching flanges abutting the band and secured thereto, a bridging portion between the attaching flanges and body extending from the occlusal end of the body gingivally and terminating substantially short of the gingival end of the body, and a pointed end at the gingival end of the bridging portion, the pointed end extending from within the open end of the pin opening and to between the attaching flanges terminating lingually of the buccal faces of the flanges, the buccal faces of the attaching flanges together with the opposed lingual edge of the body and the portion of the pointed end therebetween defining an arch wire slot having a buccal-lingual depth slightly greater than the arch wire thickness, the improvement in a safety lock pin comprising an elongated rectangular shank portion adapted to be received in the pin opening of the bracket, a head at the gingival end of the shank portion extending lingually toward said band and having a buccal-lingual depth to freely engage the band, said head including a stop shoulder adjoining the lingual side of the shank portion to abut against the portion of the pointed end between the buccal terminal end thereof and the opposed lingual edge of the body, and a buccal-lingual wire confining portion spaced gingivally of said stop shoulder adapted to lock the arch wire in the bracket slot, and the spacing between the wire confining portion and the stop shoulder being such that when the pin is inserted in the bracket so the stop shoulder engages the pointed end a gingival-occlusal wire opening will be defined having a depth greater than the thickness of the wire to facilitate relative tipping between the bracket and wire.

7. In an orthodontic appliance as defined in claim 6, wherein the wire confining portion includes a straight buccal-lingual wall terminating lingually at the lingual edge of the head.

8. In an orthodontic appliance as defined in claim 6, wherein the wire confining portion includes an arcuate wall at the gingival end of a slot defined by a stop portion spaced from the stop shoulder.

References Cited
UNITED STATES PATENTS

| | | | |
|---|---|---|---|
| 3,085,336 | 4/1963 | Kesling | 32—14 |
| 3,128,553 | 4/1964 | Begg | 32—14 |

ROBERT PESHOCK, *Primary Examiner.*